Dec. 18, 1962 D. F. HUFFORD 3,069,182
COASTER WAGON
Filed Feb. 8, 1960 3 Sheets-Sheet 1
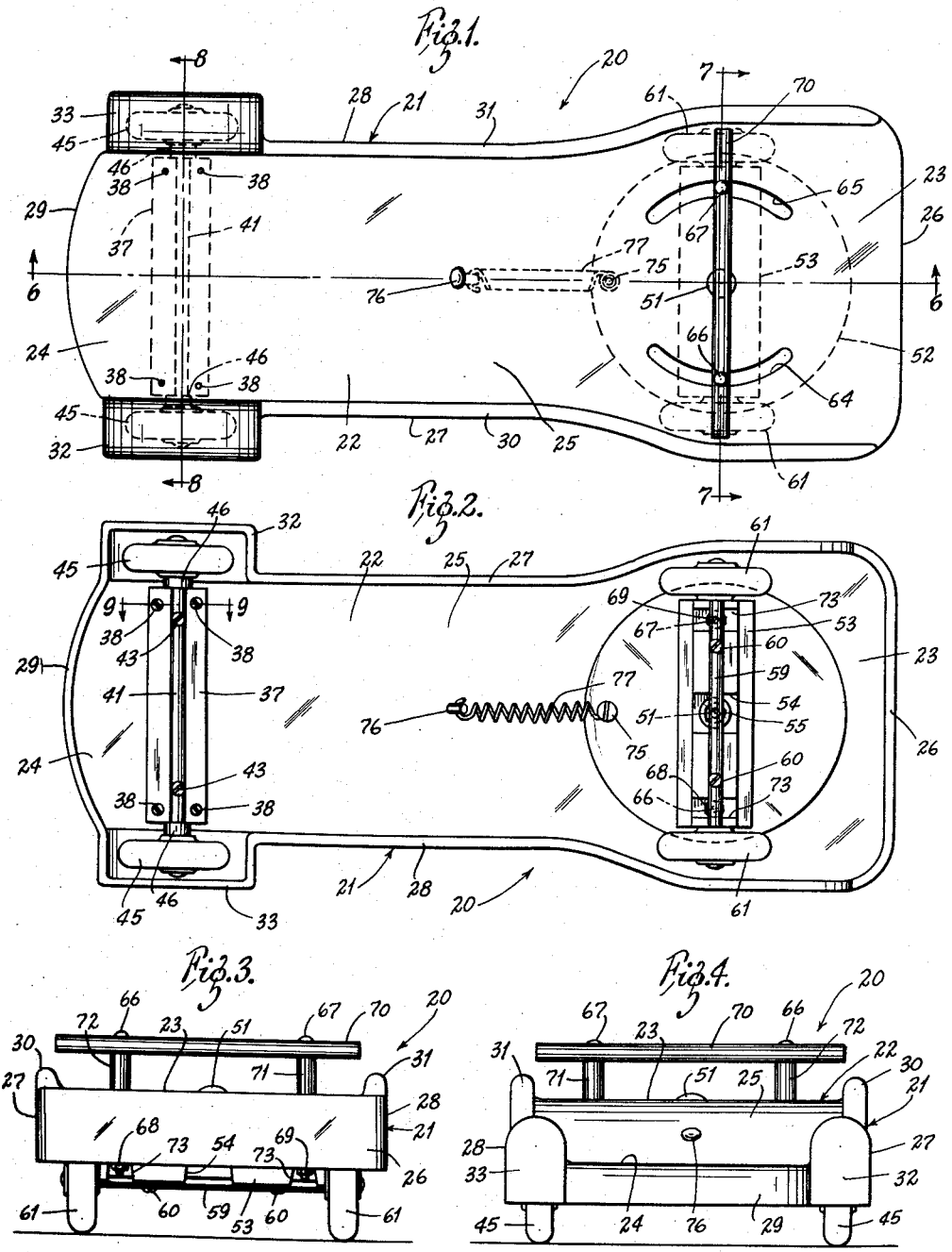
INVENTOR:
DENNIS F. HUFFORD,
By Kingsland, Rogers + Ezell
ATTORNEYS Dec. 18, 1962 D. F. HUFFORD 3,069,182
COASTER WAGON
Filed Feb. 8, 1960 3 Sheets-Sheet 2
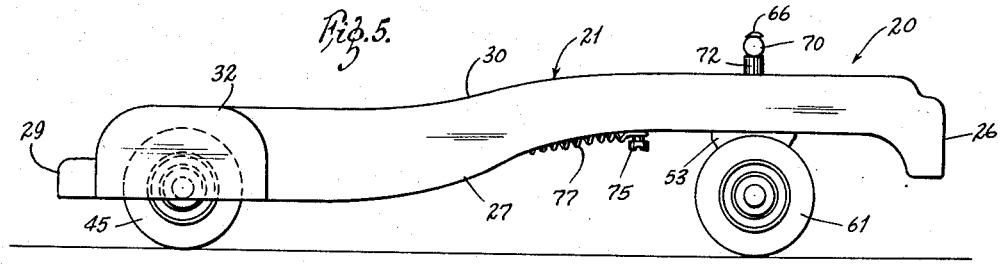
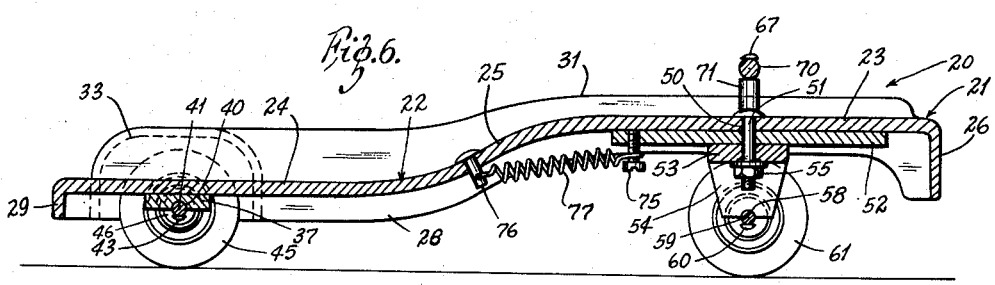
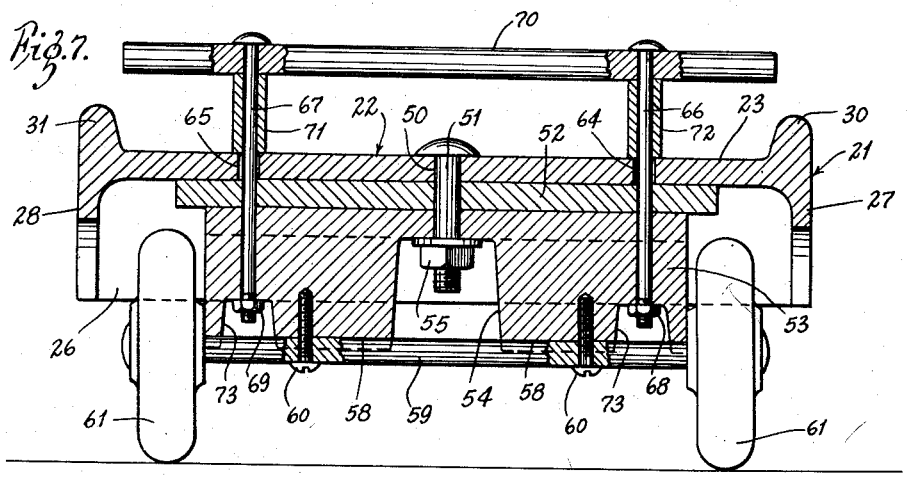
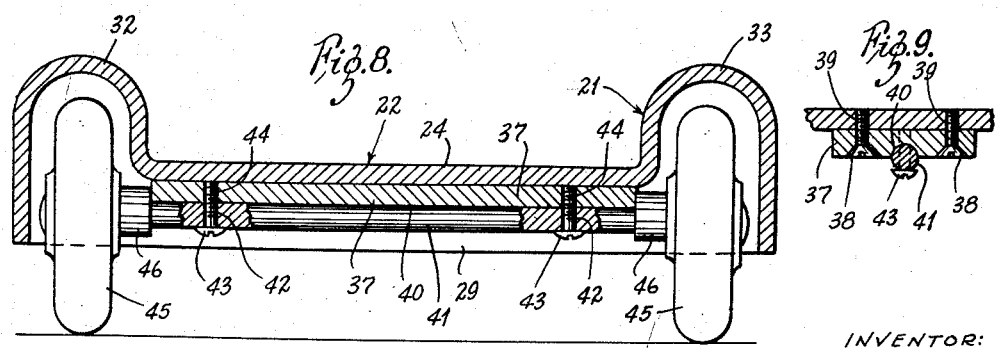
INVENTOR:
DENNIS F. HUFFORD,
BY Kingsland, Rogers & Ezell
ATTORNEYS Dec. 18, 1962 D. F. HUFFORD 3,069,182
COASTER WAGON
Filed Feb. 8, 1960 3 Sheets-Sheet 3
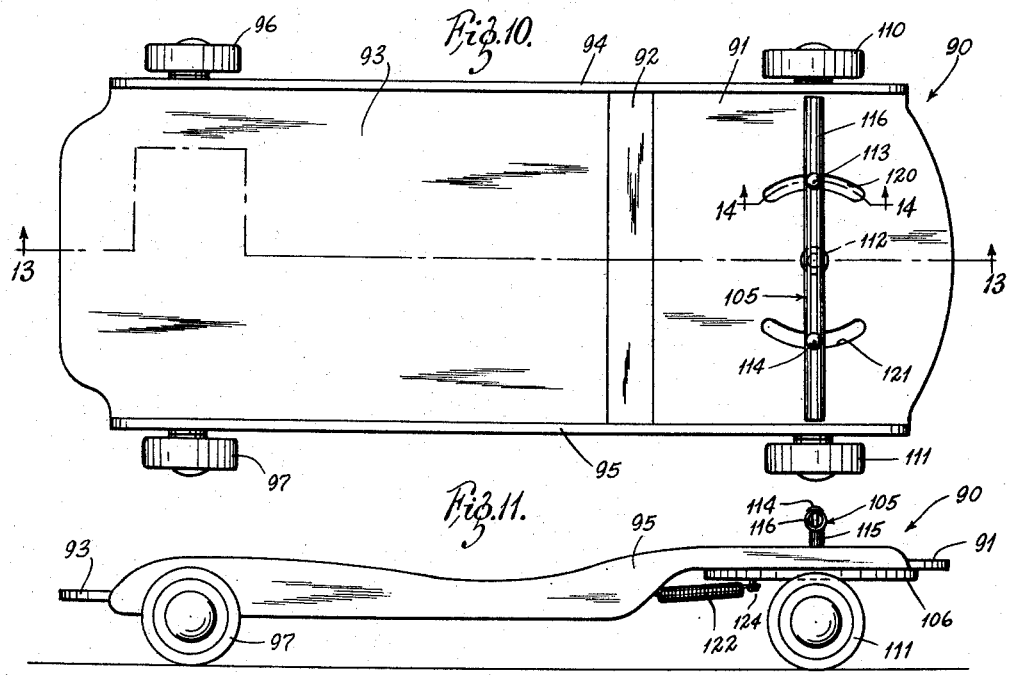
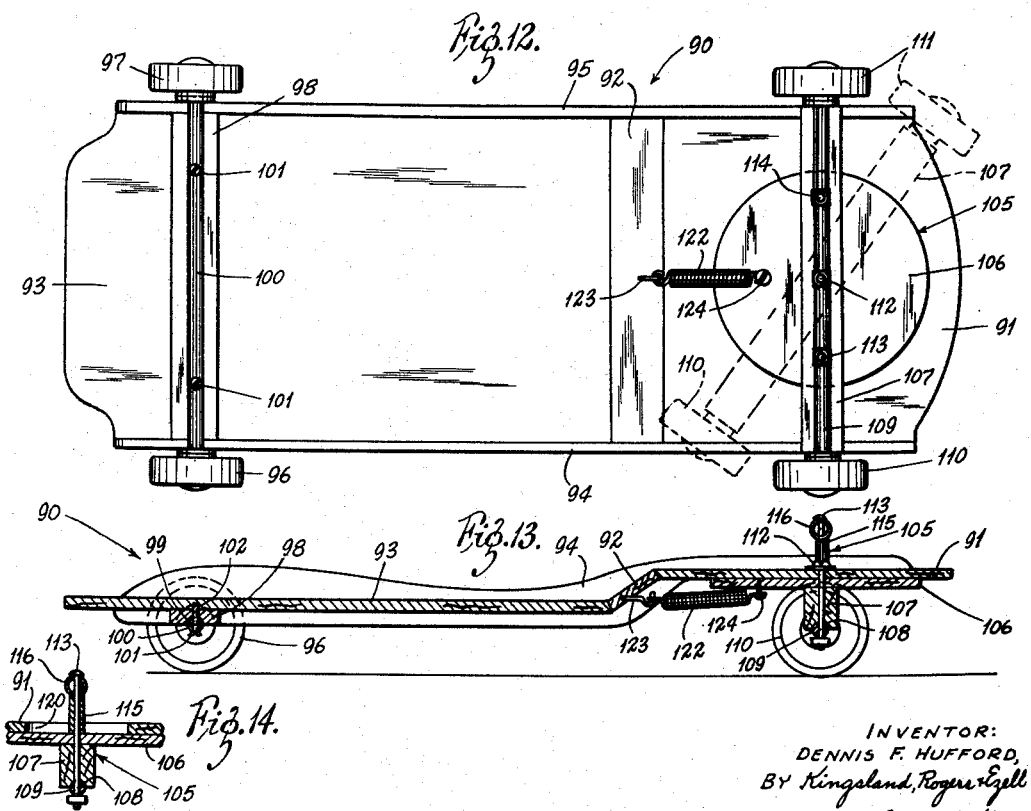
INVENTOR:
DENNIS F. HUFFORD,
BY Kingsland, Rogers & Ezell
ATTORNEYS United States Patent Office 3,069,182
Patented Dec. 18, 1962

3,069,182
COASTER WAGON
Dennis F. Hufford, 46 Hillvale Drive, Clayton,
St. Louis 5, Mo.
Filed Feb. 8, 1960, Ser. No. 7,266
2 Claims. (Cl. 280—87.01)

The present invention relates to a coaster vehicle, particularly to a coaster vehicle, which has a low center of gravity and outstanding road holding ability, even when undergoing sharp turns at relatively high speed.

The vehicle has a very flat body or bed. Between the rearward and the forward portions of the bed the body flows slightly upwardly to provide the space needed for the front wheels and steering mechanism while yet providing a bed section at the rearward end as low as possible to the ground.

Another important feature is the arrangement of its steering mechanism to provide resistance to twisting of the front wheel axles when the front wheels strike an obstruction. This resistance to twisting is accomplished by a disc to which the front wheel axle is attached, and the disc provides resistance to twisting regardless of the position of the front wheels.

Accordingly, it is an important object of the invention to provide a coaster vehicle having extremely good roadability characteristics.

Another object of the invention is to provide a coaster vehicle having a body with a low center of gravity, so that the vehicle will hold the road during sharp turns at high speeds.

Still another object of the invention is to provide a vehicle having means attached to the front wheels for preventing twisting of the axle of the front wheels when the vehicle strikes an obstruction.

Yet another object of the invention is to provide a coaster vehicle which has relatively few parts to it and is, therefore, easy to construct with only a screw driver and pliers being necessary for the purpose.

Other objects and advantages will be apparent from the detailed description to follow.

In the drawings:
FIGURE 1 is a plan view of the vehicle;
FIGURE 2 is a bottom view of the vehicle;
FIGURE 3 is a front view of the vehicle;
FIGURE 4 is a rear view of the vehicle;
FIGURE 5 is a side elevation view of the vehicle taken from the right of FIGURE 4;
FIGURE 6 is a view in section taken along the line 6—6 of FIGURE 1;
FIGURE 7 is a view in section on an enlarged scale taken along the line 7—7 of FIGURE 1;
FIGURE 8 is a view in section on an enlarged scale taken along the line 8—8 of FIGURE 1;
FIGURE 9 is a view in section on an enlarged scale taken along the line 9—9 of FIGURE 2;
FIGURE 10 is a top view of another embodiment of the invention;
FIGURE 11 is a side view of the modification of FIGURE 10;
FIGURE 12 is a bottom view of the modification of FIGURE 10;
FIGURE 13 is a view in section taken along the line 13—13 of FIGURE 10; and
FIGURE 14 is a view in section taken along the line 14—14 of FIGURE 10.

Referring now to the drawings, there is shown in FIGURES 1–9 a vehicle 20 having a body 21. The body includes a generally horizontal bed 22 having a forward horizontal portion 23 and a rearward horizontal portion 24. Between these forward and rearward portions 23 and 24, and joining them, is a slanted intermediate portion 25. As can be seen from FIGURE 6, the arrangement of the bed 22 is such that the forward portion 23 is somewhat elevated above the rearward portion 24.

The body 21 has sides and fenders, as will be described, and inasmuch as the embodiment illustrated in FIGURES 1–9 shows a cast or molded frame form, the sides and ends of the body 21 are integral with the bed 22.

In the molded form illustrated, the forward portion 23 of the bed has a downwardly extending, vertical portion or fender 26 which defines the forward end of the body 21. The fender 26 is continuous and extends down the sides of the body 21 to define a left side fender 27 and a right side fender 28, and the left and right side fenders merge into a rear fender 29.

The side fenders 27 and 28 not only extend below the bed 22, but also extend above the bed to define side rails 30 and 31. Both the side fenders 27 and 28 and the side rails 30 and 31 slope downwardly toward the rear of the coaster vehicle with the fenders 27 and 28 having their lower edges remaining generally parallel to the bed 22 while the slope of the fenders 30 and 31 is somewhat flatter than the angle of the bed 22, as defined by the sloping portion 25. These sloping angles, of course, are not critical.

The forward portion 23 of the bed is raised to provide clearance for the steering mechanism of the coaster vehicle. The lower rearward portion 24 is made as low to the ground as possible so that space must be provided for the rear wheels. For this purpose, the rails 30 and 31 expand into enlarged recesses or fenders 32 and 33 to accommodate the rear wheels.

To hold the rear axle in place, an axle block 37 is attached to the rearward portion 24 of the bed 22. Bolts 38 may be provided for this purpose, with tapped holes 39 being formed in the bed 22 to receive the bolts 38. The axle block 37 has a groove 40 formed along its length to seat an axle 41. The axle 41 has holes 42 through it and is held to the block 37 by bolts 43 secured by tapped holes 44 in the block 37. A pair of wheels 45 are secured to the ends of the axle 41 in any well-known manner, the wheels having the usual bearings. Preferably, spacer bushings 46 are provided between the wheels and the ends of the axle block 37.

The forward wheel arrangement, including the steering mechanism therefor, is one of the important features of the present invention. It is designed to prevent twisting of the axle and has been found to successfully accomplish that purpose.

There is a large hole 50 through the bed 22 at the forward portion 23 thereof, and a bolt 51 extends through the hole 50. Rotatably mounted upon the bolt 51 is a large disc 52 having a diameter only a little less than the width of the bed 22. Also attached to the bolt 51, beneath the disc 52, is an axle block 53. The axle block 53 has a sizable, centrally located recess 54 to permit the attachment of a nut 55 to the end of the bolt 51 without interfering with the wheels or steering mechanism.

The axle block 53 has the shape clearly illustrated in FIGURES 2, 6, and 7 and includes a groove 58 for seating an axle 59. The axle 59 is held to the block 53 by bolts 60. Front wheels 61 are attached to the ends of the axle 59 in a well-known manner.

To accommodate the steering mechanism, two arcuate slots 64 and 65 are cut through the bed portion 23. The slots 64 and 65 are of equal radius with their centers located at the center of the bolt 51. A pair of long bolts 66 and 67 pass through the slots 64 and 65, respectively, with nuts 68 and 69 holding the bolts 66 and 67. The axle block 53 has recesses 73 so that the nuts 68 and 69 will not interfere with the axle 59. The bolts 66 and 67 pass through the axle block 53 and the disc 52 as well as the slots 64 and 65 to hold a handle bar 70. The handle bar 70 is maintained in spaced relationship above the bed section 23 by two bushings 71 and 72.

In order to bias the front wheels toward centered position, a spring under tension is attached between the disc 52 and the bed 22. For this purpose, the disc 52 has a bolt 75 projecting from its lower surface and a rivet 76 projects through the section 25 of the bed 22. The spring 77 is connected between the bolts 75 and the rivet 76.

To use the wagon, a person, usually a child, lies flat on the bed 22 and grasps hold of the ends of the handle bar 70. The child directs the coaster wagon down a slope and controls the steering of the wagon by turning the handle bar 70. Each time the handle bar is turned, thereby turning the wheels 61, the tension spring 77 tends to return the wheels to a neutral position parallel to the wheels 45.

The disc provides extremely high resistance to twisting of the front axle and axle block assembly. When one of the front wheels strikes an obstruction, the force of the impact is transmitted through the axle 58 and the axle block 53 to the disc 52, and that force is absorbed through a large surface portion of the disc 52 rearward of the direction of impact of the wheel 61 with the obstruction. Because the disc 52 is circular, this resistance to twisting and bending exists regardless of the turning angle of the front wheel 61.

Extremely sharp turns at relatively high speeds are possible with the present coaster wagon because of the arrangement of the bed 22. The rearward portion 24 is very low to the ground, and the forward portion 23 is raised only enough to accommodate the steering mechanism including the disc 52. The sloping portion 25, of course, joins the forward and rearward portions of the bed 22. Since the bed 22 is so close to the ground, the center of gravity of the coaster wagon is low, thereby increasing the roadability of the wagon.

The assembly of the embodiment just described is a very simple operation. The molded body is a single piece. Only four bolts, the bolts 39, are necessary to attach the rear axle block 37 to the bed, and then two additional bolts 43 attach the rear axle 41 to the axle block 37.

At the forward end of the coaster wagon, the single bolt 51 secures both the disc 52 and the axle block 53 to the bed 22. Next the steering bar 70 is slipped onto the bolt 66 and 67, followed by the bushings 71 and 72. The bolts 66 and 67 are then passed through the slots 64 and 65, as well as the disc 52 and the axle block 53, and the nuts 68 and 69 are turned onto the bolts 66 and 67. The front axle 59 is readily attached by the two bolts 60. Finally, the bolt 75 is threaded into the disc 52, and the rivet 76 is passed through the bed 22 so that the spring 77 can be connected between them.

The embodiment that has just been described has a molded body. It may be of plastic, steel or any other known material. However, a preferred form of the invention employs wood in its construction, and this form is illustrated in FIGURES 10-14.

In FIGURE 10, the wagon is designated generally by the numeral 90. It is constructed of several pieces of wood which may be readily shaped by the use of a jig, as well as by other conventional methods.

The general over-all configuration of the wagon as shown in FIGURES 10-14 is generally similar to that of FIGURES 1-9 with those exceptions to be noted. As the description unfolds, it will be observed that very few separate wood panels are required in the construction of the wagon, and it will be obvious that the unskilled purchaser can quickly assemble the parts in a few minutes if it is sold in a "do-it-yourself" kit.

The bed of the wagon is formed of three separate wood sections 91, 92 and 93. The forward section 91 is higher than the rearward section 93, and these sections abut the edges of the sloping section 92. It will be observed from the drawings that the rearward section 93, which is extremely low to the ground, is considerably longer than the forward section 91. It is this rearward section 93 that the rider lies upon in the normal use of the wagon, and the higher forward section 91 is provided mainly to accommodate the steering mechanism.

The sections 91, 92 and 93 of the bed need not be attached together because they will be held in position by the sides 94 and 95. As can be seen from FIGURE 11, these sides have a somewhat contoured shape, and this shape is best formed by use of a template or a jig. The sides 94 and 95 have a plurality of screws passing through them into the several sections of the bed. The number and placement of these screws may vary according to the dictates of the art, but these screws are all that is necessary to hold the wagon body together. Because the forward section 91 of the bed is lower than the rearward section 93 and because the middle section 92 is sloping, the wagon bed itself maintains the vertical position of the sides 94 and 95 relative to the bed. In other words, each of these parts above described co-operates in its attachment to the sides 94 and 95 to maintain the several parts in rigid relative position.

The attachment of the rear wheels 96 and 97 is a simple matter requiring only a single wooden piece 98 which acts as an axle block. This axle block 98 has a longitudinal groove 99 cut into it to position the axle 100 of the rear wheels 96 and 97. In the illustration of FIGURES 12 and 13, there are a pair of studs 101 threaded into the tapped holes 102 in the underside of the bed section 93. These studs 101 hold both the axle 100 and the axle block 98 against the bed sections 93. The steering mechanism 105 is mounted on the forward bed section 91. This steering mechanism 105 includes a wooden disc 106 which is mounted beneath the forward bed section 91 as will be described. Beneath the wooden disc 106 is an axle block 107 having a greater height than the axle block 98 to compensate for the different levels of the bed sections 91 and 93. There is a longitudinal groove 108 in the axle block 107 into which is fitted the front axle 109 which carries the front wheels 110 and 111.

A single bolt 112 passes through the center of the axle 108, the center of the axle block 107, the center of the wooden disc 106 through the bed section 81, and it is about the belt 112 that the steering mechanism 105 rotates.

In addition to the bolt 112, the parts of the steering mechanism 105 are held together by a pair of bolts 113 and 114 spaced outwardly from the central bolt 112. The bolts 113 and 114 are longer than the bolt 112 and each of the bolts 113 and 114 passes through the axle 109, the axle block 107, the disc 106 and the bed section 91. These bolts 113 and 114 extend above the bed section 91 and a tubular spacing member 115 is mounted upon each of the bolts above the bed section 91. A steering bar 116 is mounted above the tubular spacing members 115 and the bolts 113 and 114 pass through the steering bar 116. When the bolts 113 and 114 are tightened, they hold as a rigid unit the steering bar 116, the two spacers 115, the wooden disc 106, the axle block 107 and the axle 108.

Looking at FIGURE 10, it can be seen that there are two slots 120 and 121 through the bed section 91 and each of the slots 120 and 121 defines a portion of an arc. The tubular spacer members 115 pass through the slots 120 and 121 and limit the rotational movement of the steering mechanism 105 as they contact the ends of these slots.

A tension spring 122 is mounted by a screw 124 to the disc 106 at one end of the spring and at the other end by a hook 123 to the slanted section 92 of the bed.

It should be apparent from the drawings that the coaster wagon is very low to the ground. For example, in the form illustrated in FIGURE 10 through 14, the wheels may be of approximately 5 inches in diameter so that the top of the rear bed section 93 is no more than 4 inches above the ground level. Because this bed section is longer than the forward section 91, it positions the bulk of the wagon body near the ground, thereby lowering the center of gravity as much as possible. The additional elevation of the forward section 91 of the bed is limited only to the clearance needed for the steering mechanism 105, and will ordinarily be only about 2 inches or so.

The assembly of the wooden form of coaster wagon may be apparent from the foregoing description but a brief summary is in order. The bed sections 91, 92 and 93 are first attached to one side 94 or 95 by means of wood screws. That having been done, the position of the parts will have been established and the other side of the body can be similarly attached. (In the "do-it-yourself" type kit, pre-drilled holes would ordinarily be provided to assist in the positioning of the parts.)

With the body assembled, the rear axle block 98 may be placed against the bottom of the bed section 93 with the holes through the axle block aligned with the tapped holes in the bed, these holes having been preformed. Next the axle 100 carrying the rear wheels 96 and 97 can be placed in the groove 99 and the studs 102 threaded into the bed. No more is needed to attach the rear wheels.

To install the steering mechanism, the wooden disc 106 is first placed beneath the bed section 91 with the central pole in the disc aligned with the central hole in the bed section. When the axle block 107 and the axle block 108 are held in place, the bolt 112 can be inserted and secured. Thereafter, the bolts 113 and 114 are passed through the steering bar 116, the spacers 115, the slots 120 and 121, the disc 106, the axle block 107 and the axle 108. Nuts are then fastened to the bolts.

Finally, the screw 124 and the hook 123 are threaded into the disc 106 and the bed section 92, respectively, and the tension spring 121 attached between them.

The use of the coaster wagon of FIGURES 10-14 is similar to that already described for the molded embodiment.

Various changes and modifications may be made within the process of this invention as will be readily apparent to those skilled in the art. Such changes and modifications are within the scope and teaching of this invention as defined by the claims appended hereto.

What is claimed is:

1. A coaster wagon comprising a body having a front end, a rear end and sides, a rear axle connected to the body adjacent the rear end thereof and a pair of wheels supported by the rear axle, the body having a rearward horizontal portion extending from the rear end to a point forward of the center of the bed, the rearward horizontal portion being at substantially the level of the rear axle, the body having a forward horizontal portion at a level above the rearward horizontal portion, a sloping panel joined to the forward and rearward horizontal portions, a hole through the forward horizontal portion, a rod extending through the hole and having a head on its upper end for preventing downward movement of the rod through the hole, a disk supported by the lower end of the rod, the disk having a diameter only a little less than the length of the forward horizontal portion and having its upper surface bearing against the lower surface of the forward horizontal portion, a front axle supported beneath the disk, a pair of wheels supported by the front axle, a pair of vertical rods rigidly connected to the front axle adjacent opposite ends thereof, a pair of arcuate slots in the forward horizontal portion through which the vertical rods extend, the upper ends of the rods being positioned above the forward horizontal portion, and a horizontal bar connected to the upper ends of the vertical rods.

2. The coaster wagon of claim 1 with yieldable means biasing the front axle toward a position parallel to the rear axle.

References Cited in the file of this patent

UNITED STATES PATENTS

| | | |
|---|---|---|
| 1,199,711 | Patterson | Sept. 26, 1916 |
| 1,364,612 | Church | Jan. 4, 1921 |
| 1,376,873 | Griswold | May 3, 1921 |
| 1,444,238 | Davis | Feb. 6, 1923 |
| 1,570,410 | Strauss | Jan. 19, 1926 |
| 1,806,749 | Ellis | May 26, 1931 |
| 2,027,522 | Eck | Jan. 14, 1936 |
| 2,136,019 | Pfau | Nov. 8, 1938 |
| 2,277,616 | Townsend | Mar. 24, 1942 |
| 2,460,021 | Manthey | Jan. 25, 1949 |
| 2,474,373 | Seiden | June 28, 1949 |
| 2,928,682 | Spencer et al. | Mar. 15, 1960 |
| 2,973,048 | Jensen | Feb. 28, 1961 |